US007321288B2

(12) United States Patent
Nishimura

(10) Patent No.: US 7,321,288 B2
(45) Date of Patent: Jan. 22, 2008

(54) MOBILE TERMINAL AND SECURITY REMOTE-CONTROL SYSTEM AND METHOD USING MOBILE TERMINAL

(75) Inventor: Toru Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 10/997,013

(22) Filed: Nov. 24, 2004

(65) Prior Publication Data

US 2005/0113080 A1 May 26, 2005

(30) Foreign Application Priority Data

Nov. 26, 2003 (JP) ............................ 2003-396221

(51) Int. Cl.
*H04Q 9/00* (2006.01)
*H04M 3/00* (2006.01)

(52) U.S. Cl. ....................... 340/5.2; 340/5.7; 340/5.72; 340/5.73; 455/420

(58) Field of Classification Search ................. 340/5.2, 340/5.7, 5.72, 5.73; 455/420
See application file for complete search history.

(56) References Cited

U.S. PATENT DOCUMENTS 6,570,689 B1 * 5/2003 Kushita ...................... 398/132
6,611,742 B1 8/2003 Sand et al.
7,012,503 B2 * 3/2006 Nielsen ...................... 340/5.6

FOREIGN PATENT DOCUMENTS

| | | | |
|---|---|---|---|
| EP | 0 748 727 | A1 | 12/1996 |
| EP | 1 216 901 | A1 | 6/2002 |
| JP | 10-292688 | A | 11/1998 |
| JP | 2001-7934 | A | 1/2001 |
| JP | 2002-34080 | A | 1/2002 |
| JP | 2002-44271 | A | 2/2002 |

* cited by examiner

*Primary Examiner*—Jeffery Hofsass
*Assistant Examiner*—Scott Au
(74) *Attorney, Agent, or Firm*—Scully, Scott, Murphy, Presser, P.C.

(57) ABSTRACT

A security remote-control system includes a mobile terminal, a central server, and a key unit controlling the state of a lock. The mobile terminal has a positional-information detecting unit capable of detecting its own position, and automatically transmits a first email for requesting notification of the state of the lock to the central server when the mobile terminal is outside a predetermined area including a specific position specified by a user. The central server confirms the state of the lock through the key unit, when the central server receives the first email, and transmits to the mobile terminal a state notification email indicating the state of the lock. The mobile terminal automatically transmits to the central server a second email for instructing shutting of the lock when determining that the lock is not shut. The central server transmits to the key unit a locking instruction signal.

13 Claims, 4 Drawing Sheets

MOBILE TERMINAL AND SECURITY REMOTE-CONTROL SYSTEM AND METHOD USING MOBILE TERMINAL

This application claims priority to prior application JP 2003-396221, the disclosure of which is incorporated herein by reference.

BACKGROUND OF THE INVENTION

1. Field of the Invention

The present invention relates to remote control systems using mobile terminals. Particularly, the present invention relates to a security remote-control system and a security remote-control method using a mobile terminal.

2. Description of the Related Art

Home security systems that lock and unlock the doors of houses by the use of mobile terminals are known. For example, in a method of locking and unlocking a door disclosed in Japanese Unexamined Patent Publication No. 10-292688A, the user of a cell phone locks and unlocks the door by directly transmitting a locking/unlocking signal to an automatic lock over a public telephone line. For this purpose, the automatic lock is connected to a main telephone or the automatic lock is provided with a receiver for directly receiving radio waves from the cell phone. It is possible to lock and unlock the door by remote control, thus eliminating the need to carry a dedicated lock.

In a personal handyphone system (PHS) system for an apartment house disclosed in Japanese Unexamined Patent Publication No. 2001-7934A, the apartment house is provided with an independent wireless network, an information exchange center for managing the wireless communication over the network, and an electric service controller for controlling the door of the apartment house. Tenants of the apartment house use PHS terminals having identification (ID) numbers to transmit the confirmation result of a locking state of the door and the request for locking and unlocking the door to the information exchange center. The information exchange center inquires the ID numbers to instruct the electric service controller to accommodate the request. In this manner, it is possible to achieve reliable locking control in the apartment house.

Home automation systems for using mobile terminals to remotely control home electronic products are also known. A cell phone disclosed in the Japanese Unexamined Patent Publication No. 2002-44271A, which receives radio waves from a global positioning system (GPS) satellite, is provided with GPS receiving means for acquiring its own current position and stores home positional information and target range information specified by a user. The cell phone calls a home telephone when the cell phone is outside the target range or enters the target range to automatically control home-automation equipment. Accordingly, for example, the user can turn on an air conditioner when he/she gets close to his/her house or turn off the air conditioner when he/she gets away from his/her house.

A cell phone disclosed in Japanese Unexamined Patent Publication No. 2002-34080A is provided with positional-information acquiring means for using a GPS to acquire its own current positional information and storing means. Positional information on a specific location, distance information indicating a certain distance from the specific location, and a control signal for controlling electrical equipment provided in the specific location are registered in the storing means. The cell phone automatically transmits the control signal to the specific location when the cell phone is within a predetermined distance from the specific location based on the current positional information. Accordingly, a user can automatically and remotely turns on the electrical equipment before he/she comes back home.

SUMMARY OF THE INVENTION

It is an object of the present invention to provide a mobile terminal, a security remote-control system, and a security remote-control method, in which a user can unconsciously control the state of a lock at a specific position.

It is another object of the present invention to provide a mobile terminal, a security remote-control system, and a security remote-control method, which are capable of preventing a locking signal from being transmitted to a lock in a locked state.

It is still another object of the present invention to provide a mobile terminal, a security remote-control system, and a security remote-control method, in which a user can flexibly be accommodated to change of a provider offering a security service or change in the content of the service.

The present invention provides, in its first aspect, a security remote-control system including a mobile terminal; a central server connected to the mobile terminal so as to communicate with the mobile terminal; and a key unit that is connected to the central server so as to communicate with the central server and that controls the state of a lock. The mobile terminal has a positional-information detecting unit capable of detecting its own position. The mobile terminal automatically transmits a first email for requesting notification of the state of the lock to the central server when the mobile terminal is outside a predetermined area including a specific position specified by a user. The central server confirms the state of the lock through the key unit, when the central server receives the first email, and transmits to the mobile terminal a state notification email indicating the state of the lock.

In the security remote-control system of the present invention, the central server preferably transmits to the key unit a state confirmation signal for instructing confirmation of the state of the lock when the central server receives the first email. The key unit preferably checks the state of the lock when the key unit receives the state confirmation signal and transmits to the central server a result signal indicating the check result. The central server preferably transmits to the mobile terminal the state notification email indicating the state of the lock based on the result signal.

In the security remote-control system of the present invention, the mobile terminal preferably automatically transmits to the central server a second email for instructing shutting of the lock when the mobile terminal determines based on the received state notification email that the lock is not shut. The central server preferably transmits to the key unit a locking instruction signal for instructing shutting of the lock when the central server receives the second email and transmits to the mobile terminal a locking notification email indicating that the lock is shut.

In the security remote-control system of the present invention, the mobile terminal preferably further includes a storage unit and a positional-information comparing unit. The first email, the second email, specific-position information indicating the specific position, and terminal-position information detected by the positional-information detecting unit are preferably stored in the storage unit. The positional-information comparing unit preferably compares the specific-position information with the terminal-position information and transmits the first email to the central server based on the comparison result.

In the security remote-control system of the present invention, the central server preferably includes a database for storing identification information on the user of the mobile terminal, the identification information being associated with an identification number of the key unit. The central server preferably extracts the identification information on the user from the database based on an email address contained in the first email or the second email and identifies the key unit based on the identification number corresponding to the extracted identification information.

In the security remote-control system of the present invention, the key unit preferably includes a lock, a communication unit for receiving from the central server a control signal that controls the state of the lock, and a control unit for automatically controlling the state of the lock in accordance with the control signal.

The present invention provides, in its second aspect, a mobile terminal including a positional-information detecting unit and a positional-information comparing unit. The positional-information detecting unit detects a terminal position that is the position of the mobile terminal. The positional-information comparing unit compares a specific position specified by a user with the terminal position and automatically transmits a first email for requesting notification of the state of the lock to a central server for managing a lock at the specific position when a distance between the specific position and the terminal position exceeds a predetermined value. The mobile terminal preferably automatically transmits a second email for instructing shutting of the lock to the central server when the mobile terminal receives a state notification email indicating the state of the lock from the central server and determines that the lock is not shut based on the state notification email.

The present invention provides, in its third aspect, a central server including a communication unit, a database, and a control unit. The communication unit communicates with a mobile terminal and a key unit that is located at a specific position specified by a user of the mobile terminal and that controls the state of a lock. The database stores identification information on the user of the mobile terminal and an identification number of the key unit, the identification number being associated with the identification information. The control unit extracts the identification information on the user from the database based on an email address contained in a first email for requesting notification of the state of the lock, when the control unit receives the first email from the mobile terminal through the communication unit. The control unit identifies the key unit based on the identification number corresponding to the extracted identification information and transmits a state confirmation signal for instructing the key unit to check the state of the lock to the key unit through the communication unit. The control unit preferably extracts the identification information on the user from the database based on an email address contained in a second email for instructing shutting of the lock, when the control unit receives the second email from the mobile terminal through the communication unit. The control unit preferably identifies the key unit based on the identification number corresponding to the extracted identification information and transmits a locking instruction signal for instructing shutting of the lock to the key unit through the communication unit.

The present invention provides, in its fourth aspect, a security remote-control method used in a security remote-control system including a mobile terminal capable of detecting its own position, a central server connected to the mobile terminal so as to communicate with the mobile terminal, and a key unit that is connected to the central server so as to communicate with the central server and that controls the state of a lock. The security remote-control method includes the steps of registering in the mobile terminal, by a user of the mobile terminal, specific-position information indicating a specific position where the key unit is located; registering in the mobile terminal, by the user, a first email for requesting notification of the state of the lock; registering in the mobile terminal, by the user, a second email for instructing shutting of the lock; automatically transmitting the first email to the central server, by the mobile terminal, when the mobile terminal is outside a predetermined area including the specific position; and confirming the state of the lock through the key unit in accordance with the first email to transmit to the mobile terminal a state notification email indicating the confirmed state of the lock, by the central server.

The security remote-control method of the present invention preferably further includes the steps of automatically transmitting the second email to the central server, by the mobile terminal, when the mobile terminal determines based on the received state notification email that the lock is not shut; and transmitting to the key unit a locking instruction signal for instructing shutting of the lock in accordance with the second email and transmitting to the mobile terminal a locking notification email indicating that the lock is shut, by the central server.

The security remote-control method of the present invention preferably further includes the steps of transmitting to the key unit a state confirmation signal for instructing confirmation of the state of the lock, by the central server, when the central server receives the first email; checking the state of the lock in accordance with the state confirmation signal to transmit to the central server a result signal indicating the check result, by the key unit; and transmitting to the mobile terminal the state notification email indicating the state of the lock based on the result signal, by the central server.

According to the mobile terminal, the security remote-control system, and the security remote-control method of the present invention, a user can unconsciously control the state of a lock at a specific position.

According to the mobile terminal, the security remote-control system, and the security remote-control method of the present invention, it is possible to prevent a locking signal from being transmitted to a lock in a locked state.

According to the mobile terminal, the security remote-control system, and the security remote-control method of the present invention, a user can flexibly be accommodated to change of a provider offering a security service or change in the content of the service.

The above and other objects and features of the present invention will become clear from the following description of the preferred embodiments taken in conjunction with the accompanying drawings.

DESCRIPTION OF THE PREFERRED EMBODIMENTS

Embodiments of a security remote-control system and a security remote-control method of the present invention, using a wireless mobile terminal, will be described below with reference to the attached drawings.

Figure 1:
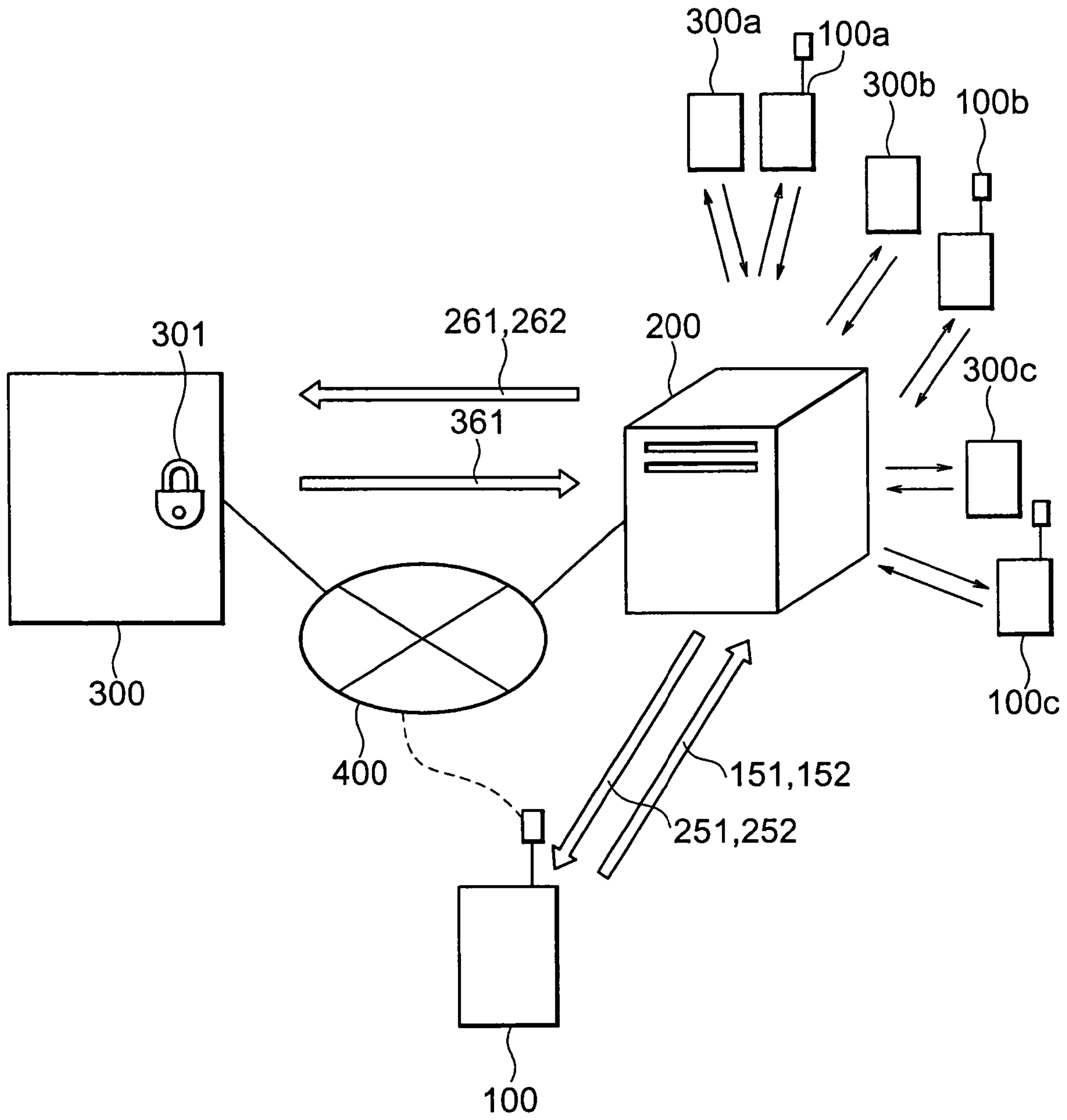
FIG. 1 is a schematic view showing the structure of a security remote-control system according to an embodiment of the present invention.

FIG. 1 is a schematic view showing the structure of a security remote-control system according to an embodiment of the present invention. The security remote-control system has a mobile terminal 100, a security center (central server) 200, and a key unit 300. The mobile terminal 100 is exemplified by a cell phone, a PHS terminal, or a personal digital assistant (PDA). The security center (central server) 200 is a facility or an apparatus for supplying security services to users. The key unit 300 is provided in a target for which a user wants to achieve security. The key unit 300 controls the state of a lock 301. The target is exemplified by a house, a company, or a car. The key unit 300 is exemplified by an electronic key.

The mobile terminal 100 is connected to the security center 200 so as to communicate with the security center 200. The security center 200 is connected to the key unit 300 so as to communicate with the key unit 300. For example, as shown in FIG. 1, the mobile terminal 100 is connected to a base station (not shown) via a wireless line. The base station is connected to the security center 200 over the Internet 400. The security center 200 is connected to the key unit 300 over the Internet 400. The security center 200 and the key unit 300 may be connected to the Internet 400 over a wireless local area network (LAN).

The signal flow in the security remote-control system of the present invention will now be described. A position which is specified by a user and at which the key unit 300 is located is called a specific position. The mobile terminal 100 has a positional-information detecting unit capable of detecting its own position, as described below. When the mobile terminal 100 is outside a predetermined area including the specific position, the mobile terminal 100 automatically transmits a state-notification request email (a first email) 151 to the security center 200. The state-notification request email 151 is an email for instructing the security center 200 to confirm a locking state of the lock 301.

When the security center 200 receives the state-notification request email 151, the security center 200 transmits a state confirmation signal 261 to the key unit 300. The state confirmation signal 261 is a signal for instructing the key unit 300 to check the locking state of the lock 301. When the key unit 300 receives the state confirmation signal 261, the key unit 300 checks the state of the lock 301 and transmits a result signal 361 indicating the check result to the security center 200. When the security center 200 receives the result signal 361, the security center 200 transmits a state notification email 251 indicating the locking state of the lock 301 to the mobile terminal 100 based on the result signal 361.

If the mobile terminal 100 determines that the lock 301 is not shut based on the received state notification email 251, the mobile terminal 100 automatically transmits a locking request email (a second email) 152 to the security center 200. The locking request email 152 is an email for instructing the security center 200 to shut the lock 301. When the security center 200 receives the locking request email 152, the security center 200 transmits a locking instruction signal 262 to the key unit 300. The locking instruction signal 262 is a signal for instructing the key unit 300 to shut the lock 301. When the key unit 300 receives the locking instruction signal 262, the key unit 300 shuts the lock 301. Concurrently, the security center 200 transmits, to the mobile terminal 100, a locking notification email 252 indicating that the lock 301 is shut. The user receives the locking notification email 252 and is notified that he/she has forgotten to shut the lock 301 and that the lock 301 is shut. Unlike in known arts, it is not necessary for the user to consciously access the security center 200. In other words, the user can unconsciously and remotely control the security system away from home.

The security remote-control system of the present invention is capable of providing the security service to multiple users. Specifically, the security center 200 is connected to multiple mobile terminals 100*a*, 100*b*, and 100*c* and to the corresponding multiple key units 300*a*, 300*b*, and 300*c* so as to communicate with the mobile terminals 100*a*, 100*b*, and 100*c* and with the corresponding multiple key units 300*a*, 300*b*, and 300*c*. The security remote-control system for each of the users has the same structure as the one described above. The structures of the mobile terminal 100, the security center 200, and the key unit 300 will be described in detail below.

Figure 2:
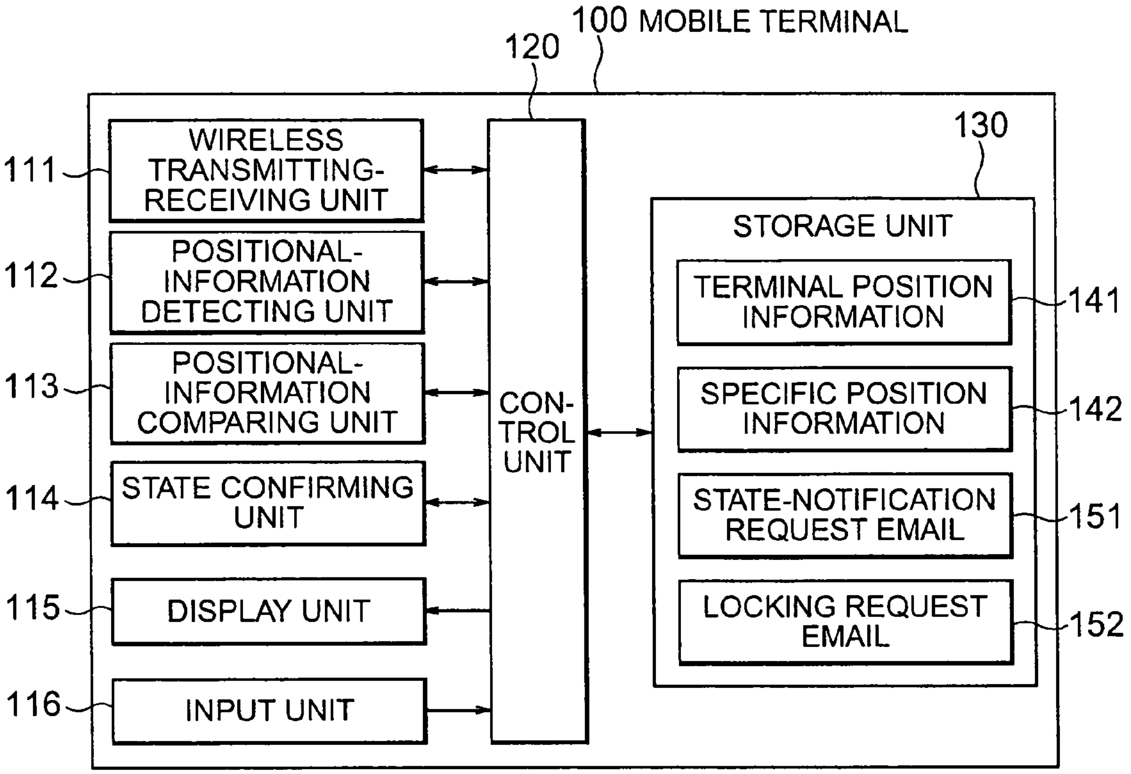
FIG. 2 is a block diagram of a mobile terminal in the security remote-control system of the present invention.

FIG. 2 is a block diagram of the mobile terminal 100 according to an embodiment of the present invention. The mobile terminal 100 schematically includes a wireless transmitting-receiving unit 111, a positional-information detecting unit 112, a positional-information comparing unit 113, a state confirming unit 114, a display unit 115, an input unit 116, a storage unit 130, and a control unit 120 controlling the above components. Data stored in the storage unit 130 includes terminal-position information 141, specific-position information 142, the state-notification request email 151, and the locking request email 152. The storage unit 130 may storage a program relating to the operation of the control unit 120.

The wireless transmitting-receiving unit 111, which has an antenna and a wireless telephone function, transmits and/or receives a high-frequency wireless signal. The display unit 115 outputs information to the user of the mobile terminal 100. For example, the display unit 115 has a liquid crystal display (LCD) or a light emitting diode (LED) for displaying the transmitted and/or received data or the operation content. The input unit 116 is used by the user for inputting data in the mobile terminal 100. The input unit 116 is, for example, a keypad, a touch panel, or a microphone. The control unit 120 processes digital signals transmitted and/or received by the use of the wireless transmitting-receiving unit 111, executes programs, and communicates data.

The specific-position information 142 indicates a position which is specified by the user and for which the security is achieved (hereinafter referred to as the specific position). That is, the specific-position information 142 indicates a place where the key unit 300 (refer to FIG. 1) is located. The specific-position information 142 is input in advance by the user with the input unit 116. The input specific-position information 142 is stored in the storage unit 130 by the control unit 120. The specific position is exemplified by a house, a company, or a car. The specific-position information 142 is exemplified by an address, a latitude, or a longitude. The specific-position information 142 may be information indicating a predetermined area including the specific position.

The user inputs the state-notification request email (first email) 151 and the locking request email (second email) 152 with the input unit 116. The state-notification request email 151 is an email for instructing the security center 200 to confirm the locking state of the lock 301. The locking request email 152 is an email for instructing the security center 200 to shut the lock 301 (refer to FIG. 1). The state-notification request email 151 and the locking request email 152 is preferably prepared in accordance with a format specified by a provider (hereinafter referred to as a service provider) offering the security service. For example, a keyword, such as "locking state confirmation" or "locking request", is input in a "subject matter" field of the corresponding email. The input state-notification request email 151 and the locking request email 152 are stored in the storage unit 130 by the control unit 120.

The positional-information detecting unit 112 periodically detects the position of the mobile terminal 100. For example, the positional-information detecting unit 112 has a GPS receiver and periodically detects the position of the mobile terminal 100 with the GPS. Alternatively, the positional-information detecting unit 112 may detect the position of the mobile terminal 100 based on the base-station identification information on the corresponding PHS base station. The detected positional information is stored in the storage unit 130 by the control unit 120 as the terminal-position information 141. The terminal-position information 141 is exemplified by the latitude and longitude information on the mobile terminal 100.

The positional-information comparing unit 113 compares the terminal-position information 141 stored in the storage unit 130 with the specific-position information 142. If the positional-information comparing unit 113 determines that the mobile terminal 100 is outside the predetermined area including the specific position, the positional-information comparing unit 113 transmits the state-notification request email 151 to the security center 200 through the wireless transmitting-receiving unit 111 (refer to FIG. 1). The positional-information comparing unit 113 is exemplified by a computer program executed by the control unit 120.

The state notification email 251 transmitted from the security center 200 (refer to FIG. 1) is received by the wireless transmitting-receiving unit 111 and is supplied to the state confirming unit 114 by the control unit 120. The state confirming unit 114 confirms (determines) the locking state of the lock 301 based on the received state notification email 251. If the state confirming unit 114 determines that the lock 301 is not shut, the state confirming unit 114 transmits the locking request email 152 to the security center 200 through the wireless transmitting-receiving unit 111 (refer to FIG. 1). The state confirming unit 114 is exemplified by a computer program executed by the control unit 120.

The locking notification email 252 transmitted from the security center 200 (refer to FIG. 1) is received by the wireless transmitting-receiving unit 111. The fact that the locking notification email 252 is received is displayed in the display unit 115 to inform the user of the reception. The user is informed, due to the locking notification email 252, that he/she has forgotten to shut the lock 301 and that the lock 301 is shut. In this manner, the user can unconsciously and remotely control the security system away from home.

Figure 3:
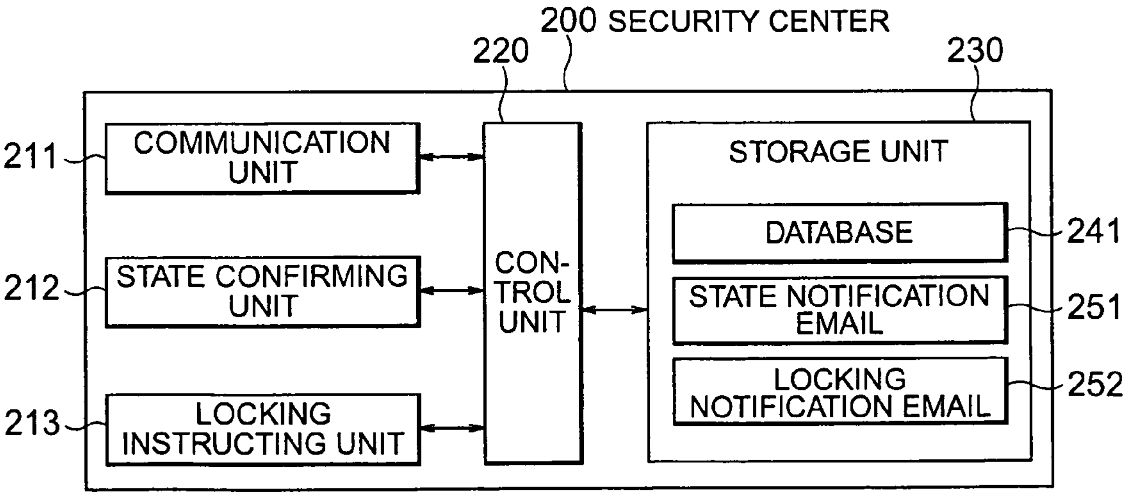
FIG. 3 is a block diagram of a security center in the security remote-control system of the present invention.

FIG. 3 is a block diagram of the security center (central server) 200 according to an embodiment of the present invention. The security center 200 includes a communication unit 211, a state confirming unit 212, a locking instructing unit 213, a storage unit 230, and a control unit 220 controlling the above components. The communication unit 211 transmits and/or receives an email or a signal to and/or from the mobile terminal 100 or the key unit 300 over the Internet 400. The control unit 220 processes digital signals transmitted and/or received by the use of the communication unit 211, executes programs, and communicates data.

Data stored in the storage unit 230 includes a database 241, the state notification email 251, and the locking notification email 252. The database 241 contains data concerning customers using the service. The data concerning the customers includes the email address of the mobile terminal 100 and the identification number of the key unit 300. The email address is associated with the identification number to be stored in the database 241. The state notification email 251, which is an email indicating the locking state of the lock 301, is transmitted to the mobile terminal 100. The locking notification email 252, which is an email indicating that the lock 301 is shut, is transmitted to the mobile terminal 100 (refer to FIG. 1). The storage unit 230 may storage a program relating to the operation of the control unit 220.

The state-notification request email 151 transmitted from the mobile terminal 100 (refer to FIGS. 1 and 2) is received by the communication unit 211 and is supplied to the state confirming unit 212 by the control unit 220. The state confirming unit 212 extracts ID information on the user from the state-notification request email 151. The ID information on the user is exemplified by the address or password of the mobile terminal 100. The state confirming unit 212 also extracts the identification number of the key unit 300 from the database 241 stored in the storage unit 230, based on the extracted ID information on the user. Then, the state confirming unit 212 automatically transmits the state confirmation signal 261 to the key unit 300 through the communication unit 211, based on the extracted identification number. The result signal 361 transmitted from the key unit 300 (refer to FIG. 1) is received by the communication unit 211 and is supplied to the state confirming unit 212 by the control unit 220. The state confirming unit 212 automatically transmits the state notification email 251 to the mobile terminal 100 through the communication unit 211 based on the result signal 361. The state confirming unit 212 is exemplified by a computer program executed by the control unit 220.

The locking request email 152 transmitted from the mobile terminal 100 (refer to FIGS. 1 and 2) is received by the communication unit 211 and is supplied to the locking instructing unit 213 by the control unit 220. The locking instructing unit 213 extracts ID information on the user from the locking request email 152. The locking instructing unit 213 also extracts the identification number of the key unit 300 from the database 241 stored in the storage unit 230, based on the extracted ID information on the user. Then, the locking instructing unit 213 automatically transmits the locking instruction signal 262 to the key unit 300 through the communication unit 211, based on the extracted identification number. The locking instructing unit 213 also automatically transmits the locking notification email 252 to the mobile terminal 100 through the communication unit 211 (refer to FIG. 1). The locking instructing unit 213 is exemplified by a computer program executed by the control unit 220.

Figure 4:
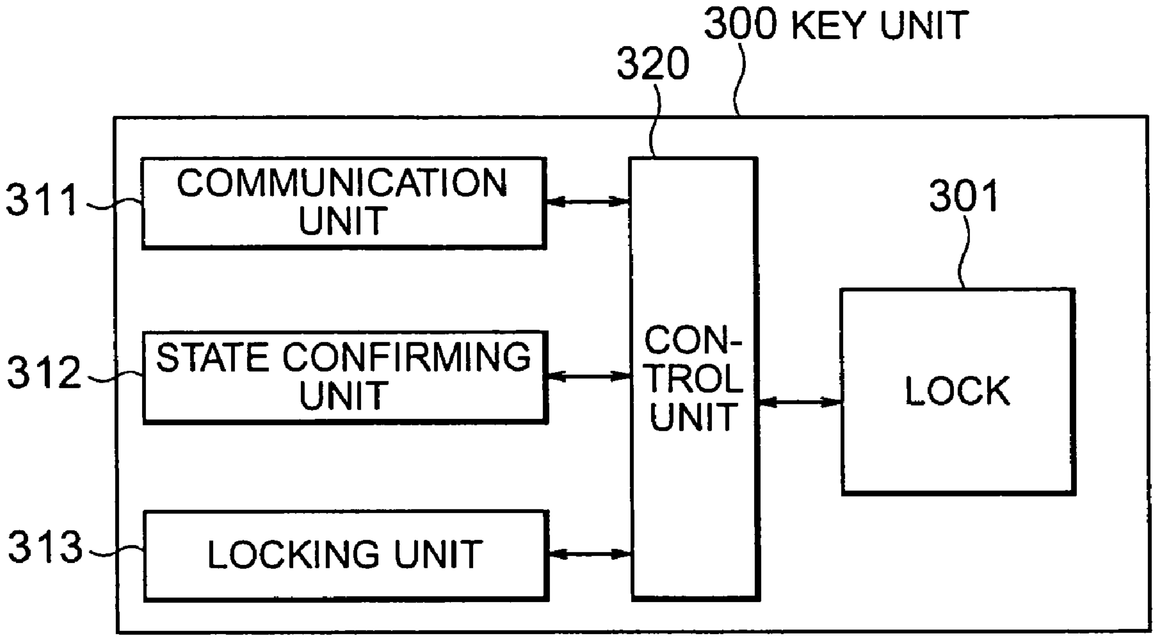
FIG. 4 is a block diagram of a key unit in the security remote-control system of the present invention.

FIG. 4 is a block diagram of the key unit 300 according to an embodiment of the present invention. The key unit 300 includes a communication unit 311, a state confirming unit

312, a locking unit 313, the lock 301, and a control unit 320 controlling the above components. The locking unit 313 transmits and/or receives a signal to and/or from the security center 200 over the Internet 400. The control unit 320 processes digital signals transmitted and/or received by the use of the communication unit 311, executes programs, and communicates data.

The state confirmation signal 261 transmitted from the security center 200 (refer to FIGS. 1 and 3) is received by the communication unit 311 and is supplied to the state confirming unit 312 by the control unit 320. When the state confirming unit 312 receives the state confirmation signal 261, the state confirming unit 312 checks a locking state of the lock 301. The state confirming unit 312 transmits the result signal 361 indicating the check result to the security center 200 through the communication unit 311. The state confirming unit 312 is exemplified by a computer program executed by the control unit 320.

The locking instruction signal 262 transmitted from the security center 200 (refer to FIGS. 1 and 3) is received by the communication unit 311 and is supplied to the locking unit 313 by the control unit 320. When the locking unit 313 receives the locking instruction signal 262, the locking unit 313 shuts the lock 301. The locking unit 313 is exemplified by a computer program executed by the control unit 320.

Figure 5:
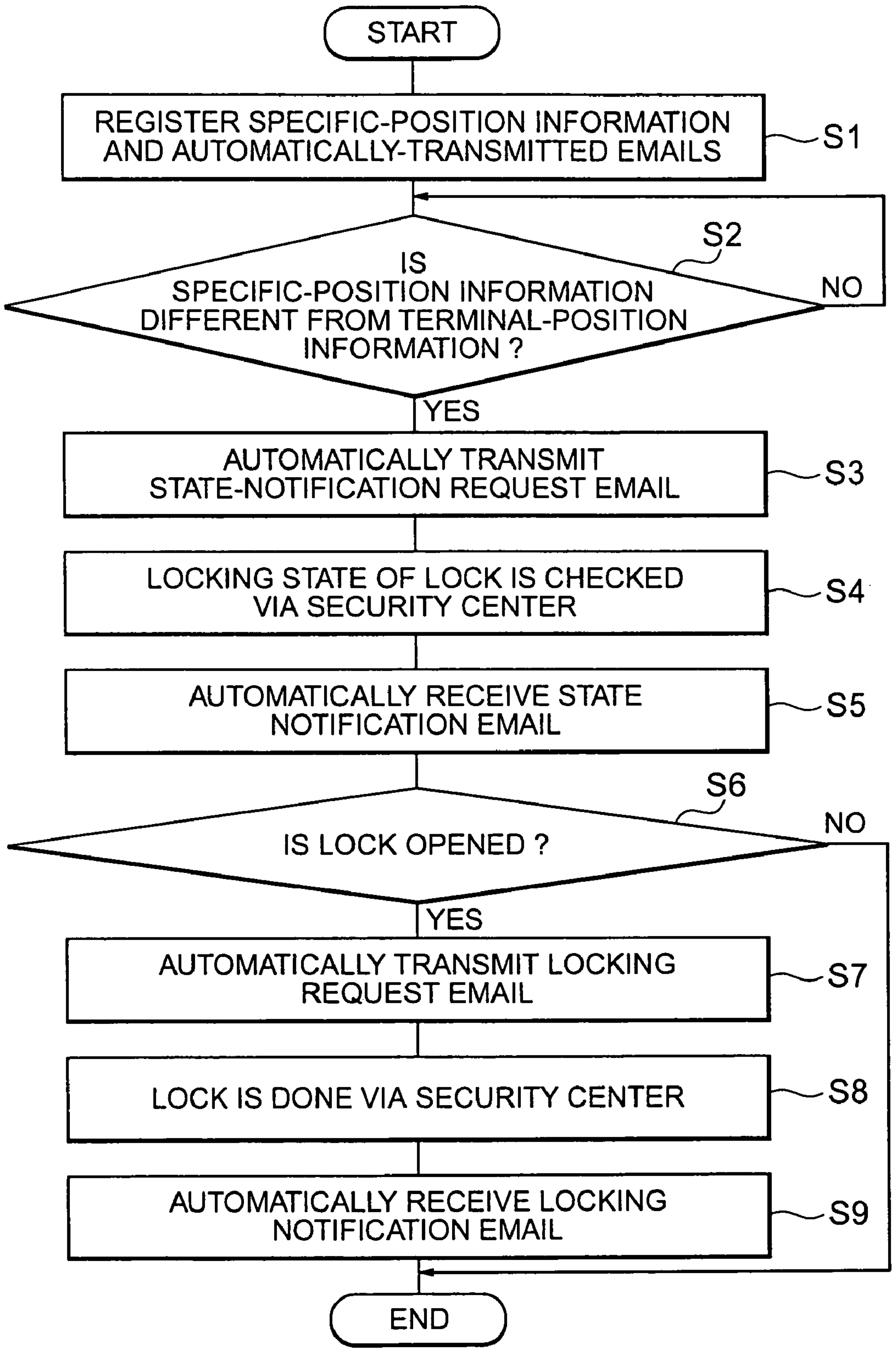
FIG. 5 is a flowchart showing a security remote-control method according to an embodiment of the present invention.

FIG. 5 is a flowchart showing a security remote-control method according to an embodiment of the present invention.

In Step S1, a user registers in the mobile terminal 100 the specific-position information 142 and the emails (the state-notification request email 151 and the locking request email 152) automatically transmitted to the security center 200. The specific-position information 142 indicates a position where the user wants to receive the security service.

The mobile terminal 100 includes the positional-information detecting unit 112 for detecting its own position and periodically acquires the terminal-position information 141. In Step S2, the mobile terminal 100 determines its own state based on the specific-position information 142 and the terminal-position information 141. If the mobile terminal 100 is outside a predetermined area including the specific position (the determination is affirmative in Step S2), then in Step S3, the mobile terminal 100 automatically transmits the state-notification request email 151 to the security center 200.

When the security center 200 receives the state-notification request email 151, the security center 200 automatically transmits the state confirmation signal 261 to the key unit 300. When the key unit 300 receives the state confirmation signal 261, in Step S4, the key unit 300 checks a locking state of the lock 301. The key unit 300 transmits the result signal 361 indicating the checking state to the security center 200.

When the security center 200 receives the result signal 361, in Step S5, the security center 200 automatically transmits the state notification email 251 indicating the locking state of the lock 301 to the mobile terminal 100. The state notification email 251 is received by the mobile terminal 100.

In Step S6, the mobile terminal 100 determines whether the lock 301 is shut. If the mobile terminal 100 determines that the lock 301 is shut (the determination is negative in Step S6), the process terminates. If the mobile terminal 100 determines that the lock 301 is not shut (the determination is affirmative in Step S6), then in Step S7, the mobile terminal 100 automatically transmits the locking request email 152 to the security center 200.

When the security center 200 receives the locking request email 152, the security center 200 automatically transmits the locking instruction signal 262 to the key unit 300. When the key unit 300 receives the locking instruction signal 262, in Step S8, the key unit 300 shuts the lock 301.

In Step S9, the security center 200 automatically transmits the locking notification email 252 indicating that the lock 301 is shut to the mobile terminal 100. The mobile terminal 100 receives the locking notification email 252. The user is notified, due to the locking notification email 252, that he/she has forgotten to shut the lock 301 and that the lock 301 is shut.

According to the security remote-control system and the security remote-control method of the present invention, the mobile terminal 100 monitors its own positional information, and automatically transmits the state-notification request email 151 and the locking request email 152 if the mobile terminal 100 is outside a predetermined area that is registered. Accordingly, unlike in known arts, it is not necessary for the user to consciously access the security center 200. In other words, the user can unconsciously and remotely control the security system away from home. Furthermore, the locking request email 152 is transmitted to the security center 200 only if the mobile terminal 100 determines that the lock 301 is not shut based on the state notification email 251. Hence, the email for requesting the locking is not transmitted if the lock 301 is shut.

According to the security remote-control system and the security remote-control method of the present invention, the lock 301 is not subjected to unlocking operation. Accordingly, even if the mobile terminal 100 is stolen, an intruder can be prevented from entering a house or the like.

According to the security remote-control system and the security remote-control method of the present invention, the emails (the state-notification request email 151, the locking request email 152, the state notification email 251, and the locking notification email 252) are communicated between the mobile terminal 100 and the security center 200. Hence, there is no need for the user to purchase a mobile terminal that transmits a special control signal for security. In other words, if the user makes a contract with a service provider, the user can receive a security service using the existing mobile terminal 100. The state-notification request email 151 and the locking request email 152 are prepared in accordance with a format proposed by the service provider. For example, a keyword, such as "locking state confirmation" or "locking request", is input in a "subject matter" field of the corresponding email. For example, the email address of the mobile terminal 100 is used for confirming the user (customer). A rule that a password specified by the service provider or the user is written in the body of an email may be established. As described above, since the emails is flexible, the user can be easily accommodated to change of the service provider, change in a format proposed by the service provider, addition of a service, or the like. In addition, multiple locks 301 at a specific position can be separately controlled by the use of one e-email.

It will be further understood by those skilled in the art that the foregoing description is of the preferred embodiments of the present invention and that various changes and modifications may be made to the invention without departing from the spirit and scope thereof.

What is claimed is:

1. A security remote-control system comprising:

a mobile terminal;

a central server connected to the mobile terminal so as to communicate with the mobile terminal; and a key unit that is connected to the central server so as to communicate with the central server and that controls the state of a lock, wherein the mobile terminal has a positional-information detecting unit capable of detecting its own position, and automatically transmits a first email for requesting notification of the state of the lock to the central server when the mobile terminal is outside a predetermined area including a specific position specified by a user, and wherein the central server confirms the state of the lock through the key unit, when the central server receives the first email, and transmits to the mobile terminal a state notification email indicating the state of the lock.

2. The security remote-control system according to claim 1, wherein the central server transmits to the key unit a state confirmation signal for instructing confirmation of the state of the lock when the central server receives the first email, wherein the key unit checks the state of the lock when the key unit receives the state confirmation signal and transmits to the central server a result signal indicating the check result, and wherein the central server transmits to the mobile terminal the state notification email indicating the state of the lock based on the result signal.

3. The security remote-control system according to claim 1 or 2, wherein the mobile terminal automatically transmits to the central server a second email for instructing shutting of the lock when the mobile terminal determines, based on the received state notification email, that the lock is not shut, and wherein the central server transmits to the key unit a locking instruction signal for instructing shutting of the lock when the central server receives the second email, and transmits to the mobile terminal a locking notification email indicating that the lock is shut.

4. The security remote-control system according to claim 3, wherein the mobile terminal further includes a storage unit and a positional-information comparing unit, wherein the first email, the second email, specific-position information indicating the specific position, and terminal-position information detected by the positional-information detecting unit are stored in the storage unit, and wherein the positional-information comparing unit compares the specific-position information with the terminal-position information and transmits the first email to the central server based on the comparison result.

5. The security remote-control system according to claim 4, wherein the central server includes a database for storing identification information on the user of the mobile terminal, the identification information being associated with an identification number of the key unit, wherein the central server extracts the identification information on the user from the database based on an email address contained in the first email or the second email, and wherein the central server identifies the key unit based on the identification number corresponding to the extracted identification information.

6. The security remote-control system according to any of claims 5, wherein the key unit includes: a lock; a communication unit for receiving a control signal that controls the state of the lock from the central server; and a control unit for automatically controlling the state of the lock in accordance with the control signal.

7. A mobile terminal comprising:

a positional-information detecting unit; and a positional-information comparing unit, wherein the positional-information detecting unit detects a terminal position that is the position of the mobile terminal, and wherein the positional-information comparing unit compares a specific position specified by a user with the terminal position and automatically transmits, to a central server for managing a lock at the specific position, a first email for requesting notification of the state of the lock when a distance between the specific position and the terminal position exceeds a predetermined value.

8. The mobile terminal according to claim 7, wherein the mobile terminal automatically transmits a second email for instructing shutting of the lock to the central server when the mobile terminal receives a state notification email indicating the state of the lock from the central server and determines that the lock is not shut based on the state notification email.

9. A central server comprising:

a communication unit;

a database; and a control unit, wherein the communication unit communicates with a mobile terminal and a key unit that is located at a specific position specified by a user of the mobile terminal and that controls the state of a lock, wherein the database stores identification information on the user of the mobile terminal and an identification number of the key unit, the identification number being associated with the identification information, wherein the control unit extracts the identification information on the user from the database based on an email address contained in a first email for requesting notification of the state of the lock, when the control unit receives the first email from the mobile terminal through the communication unit, and wherein the control unit identifies the key unit based on the identification number corresponding to the extracted identification information and transmits a state confirmation signal for instructing the key unit to check the state of the lock to the key unit through the communication unit.

10. The central server according to claim 9, wherein the control unit extracts the identification information on the user from the database based on an email address contained in a second email for instructing shutting of the lock, when the control unit receives the second email from the mobile terminal through the communication unit, and wherein the control unit identifies the key unit based on the identification number corresponding to the extracted identification information and transmits a locking instruction signal for instructing shutting of the lock to the key unit through the communication unit.

11. A security remote-control method used in a security remote-control system including a mobile terminal capable of detecting its own position, a central server connected to the mobile terminal so as to communicate with the mobile terminal, and a key unit that is connected to the central server so as to communicate with the central server and that controls the state of a lock, the security remote-control method comprising the steps of:

registering in the mobile terminal, by a user of the mobile terminal, specific-position information indicating a specific position where the key unit is located;

registering in the mobile terminal, by the user, a first email for requesting notification of the state of the lock;

registering in the mobile terminal, by the user, a second email for instructing shutting of the lock;

automatically transmitting the first email to the central server, by the mobile terminal, when the mobile terminal is outside a predetermined area including the specific position; and confirming the state of the lock through the key unit in accordance with the first email to transmit to the mobile terminal a state notification email indicating the confirmed state of the lock, by the central server.

12. The security remote-control method according to claim 11, further comprising the steps of:

automatically transmitting the second email to the central server, by the mobile terminal, when the mobile terminal determines based on the received state notification email that the lock is not shut; and transmitting to the key unit a locking instruction signal for instructing shutting of the lock in accordance with the second email and transmitting to the mobile terminal a locking notification email indicating that the lock is shut, by the central server.

13. The security remote-control method according to claim 11 or 12, further comprising the steps of:

transmitting to the key unit a state confirmation signal for instructing confirmation of the state of the lock, by the central server, when the central server receives the first email;

checking the state of the lock in accordance with the state confirmation signal to transmit to the central server a result signal indicating the check result, by the key unit; and transmitting to the mobile terminal the state notification email indicating the state of the lock based on the result signal, by the central server.

* * * * *